United States Patent [19]
Dabbs et al.

[11] Patent Number: 5,963,630
[45] Date of Patent: Oct. 5, 1999

[54] MEDIATION SERVICE CONTROL POINT WITHIN AN INTELLIGENT NETWORK

[75] Inventors: Paul Dabbs, Plano; John Kaczala, Dallas, both of Tex.

[73] Assignee: Ericsson Inc., Research Triangle Park, N.C.

[21] Appl. No.: 08/832,204

[22] Filed: Apr. 8, 1997

[51] Int. Cl.$^6$ .................................................. H04M 3/42
[52] U.S. Cl. .......................... 379/201; 379/207; 379/220
[58] Field of Search .................................... 379/207, 229, 379/230

[56] References Cited

U.S. PATENT DOCUMENTS

| | | |
|---|---|---|
| 5,553,130 | 9/1996 | Turner . |
| 5,566,235 | 10/1996 | Hetz ..................................... 379/207 X |
| 5,574,782 | 11/1996 | Baird et al. . |
| 5,692,033 | 11/1997 | Farris ................................... 379/207 X |
| 5,708,702 | 1/1998 | DePaul et al. ....................... 379/207 X |

FOREIGN PATENT DOCUMENTS 0 621 734  4/1994  European Pat. Off. .

OTHER PUBLICATIONS

PCT International Search Report, Oct. 30, 1998, PCT/US 98/06841.

*Primary Examiner*—Creighton Smith
*Attorney, Agent, or Firm*—Jenkins & Gilchrist PC

[57] ABSTRACT

A mediation Service Control Point (SCP) capable of communicating Signaling Connection Control Part (SCCP) based signals is interfaced between a plurality of Service Control Points (SCPs) each providing IN services and a Service Switching Point (SSP) serving a particular IN subscriber. In response to a need to utilize an IN service, the serving SSP transmits a query signal to the mediation SCP. The mediation SCP determines which SCP or SCPs are associated with the indicated IN subscriber and accordingly invokes or executes the determined one or more SCPs to provide the needed IN service. As a result, a one-to-one relationship imposed on the serving telecommunications network is relaxed and an IN subscriber is able to utilize IN services by way of multiple SCPs.

16 Claims, 5 Drawing Sheets

MEDIATION SERVICE CONTROL POINT WITHIN AN INTELLIGENT NETWORK

BACKGROUND OF THE INVENTION

1. Technical Field of the Invention

The present invention relates to a telecommunications network and, in particular, to the provision of a mediation service control point (SCP) serving a plurality of individual SCPs and Service Switching Points (SSPs) within an Intelligent Network (IN) based telecommunications network.

2. Description of Related Art

Within a typical telecommunications network, each subscriber is associated with a particular serving telecommunications node. Features, services, subscriber data, operation and maintenance associated with and subscribed to by the subscriber are then provided by the serving telecommunications provider. In order to identify and to route incoming signals to an appropriate telecommunications node, each subscriber is required to be associated with only one telecommunications node. For example, such a one-to-one relationship is maintained by assigning a series of directory numbers, such as a NPA-NXX-XXXX where the NPA is the area code and the NXX is the exchange identification code, to each telecommunications node. A particular one of the pre-assigned directory numbers is then correlated with a particular subscriber associated thereto. Since each NPA-NXX uniquely identifies a serving telecommunications node, the connecting telecommunications network, such as an Signaling System No. 7 (SS7) network, is able to identify and to route a signal from a first node to a second node identified by the specified directory number.

Within an Intelligent Network (IN) based telecommunications network, each IN subscriber is associated with a particular Service Control Point (SCP). In order to maintain the above described one-to-one relationship between a particular subscriber and a serving telecommunications node, each IN subscriber is similarly restricted to only one SCP and one directory number associated therewith. In case another privately operated or third party vendor SCP wishes to provide additional IN service to an existing IN customer, because of such a restriction, the existing subscription must be removed from the existing SCP and new subscription data must be added to the new SCP. Furthermore, because each SCP is also assigned with a pre-allocated series of NPA-NXX numbers, by switching from a first SCP to a second SCP, the IN subscriber needs to be assigned with a different directory number. Making such a change requires the subscriber to inconveniently contact and inform all friends, associates and the like of the new directory number. Furthermore, in order for the new SCP service provider to lure an IN subscriber having a subscription agreement with an existing SCP service provider, the new SCP must support all existing services and features currently being provided by the existing SCP. Otherwise, subscribers who are satisfied with their existing services will not purchase the services of the new SCP service provider. Consequently, even if a new SCP only wishes to introduce or provide a single IN service, the new SCP service provider is forced to further provide existing IN services currently being provided by an existing SCP service provider. Moreover, in case a first SCP provides a first group of IN services, and a second SCP provides a second group of IN services, an IN subscriber is forced to evaluate and to choose one or the other SCP service provider, but not both.

Accordingly, there is a need for a mechanism to enable a telecommunications subscriber to be associated with and be serviced by a plurality of telecommunications nodes.

SUMMARY OF THE INVENTION

A method and system for associating a subscriber with a plurality of Service Control Points (SCPs) and for providing one or more IN services within an Intelligent Network (IN) based telecommunications network is disclosed. A plurality of Service Control Points (SCPs) each providing a particular subscriber service are associated with an IN based telecommunications network. A subscriber is associated with a particular end office, such as a Service Switching Point (SSP). A mediation Service Control Point (SCP) then interfaces the plurality of SCPs with the SSP serving the IN subscriber.

The mediation Service Control Point comprises an interface module for communicating Signaling Connection Control Part (SCCP) based signals with the plurality of Service Control Points (SCPs) and Service Switching Point (SSP). The mediation SCP further comprises a first register for storing authentication data for error-checking data and parameters received from the plurality of SCPs. The mediation SCP further comprises a second register for storing data correlating one or more SCPs with a particular IN subscriber. The second register further stores data specifying the order of execution for the SCPs associated with the subscriber.

A user definable application module residing within the mediation SCP then accesses the first and second register to execute one or more SCPs associated with a particular IN subscriber to effectuate appropriate IN service.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
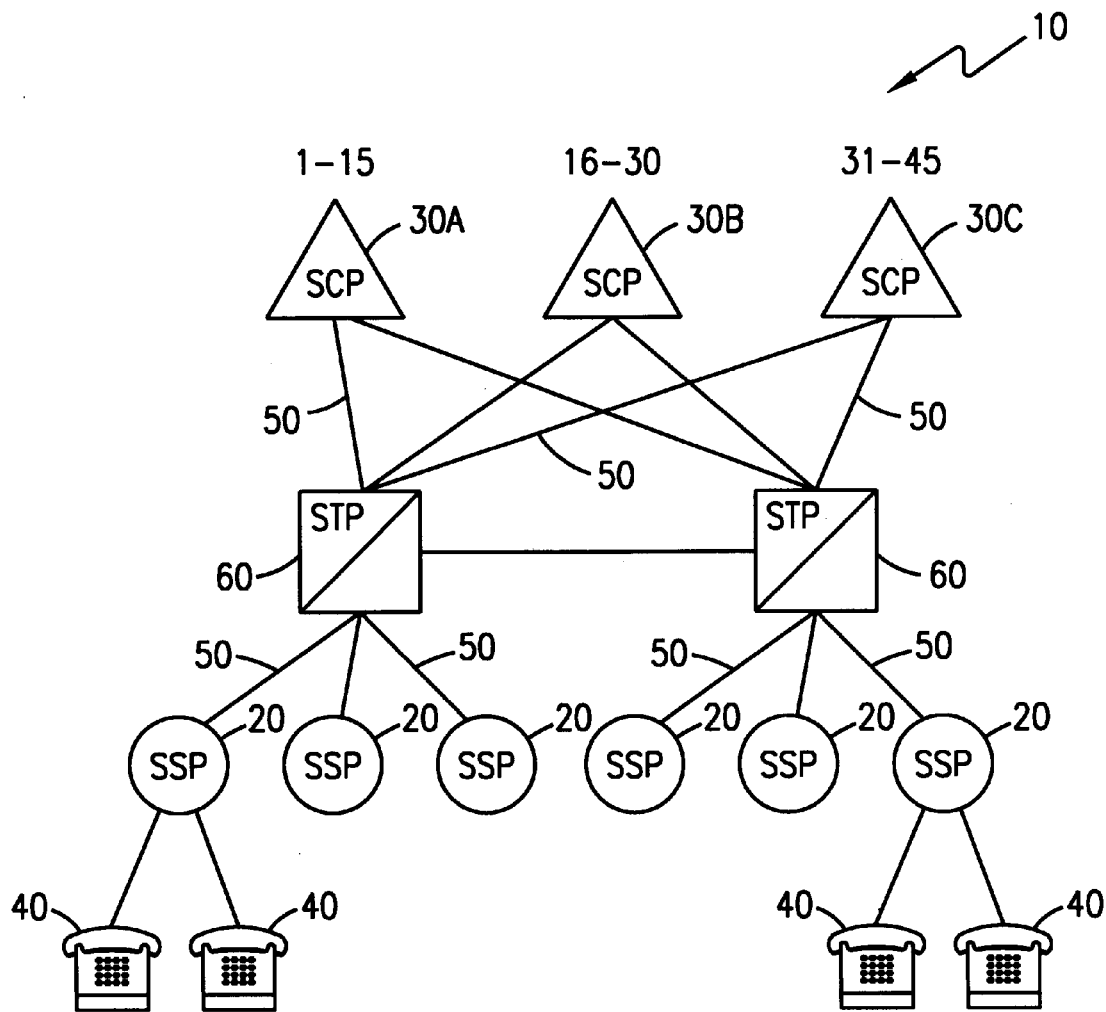
FIG. 1 is a block diagram of an Intelligent Network (IN) illustrating an one-to-one correlation between an IN subscriber and a serving Service Control Point (SCP)

FIG. 1 shows an Intelligent Network (IN) 10 providing IN services to subscribers. The basic concept behind IN is to move the intelligence out of each local exchange or Service Switching Point (SSP) 20 and to centralize the services providing the intelligence in a Service Control Point (SCP) 30. By centralizing the special subscriber services in the SCP 30, a new service can be added in only one place (i.e., the SCP) and provided to all subscribers connected to the multiple SSPs 20. Accordingly, one SSP services multiple telecommunications subscribers or terminals 40, and one SCP 30 services multiple SSPs 20 or local switches. The interfaces between the SSPs 20 and SCPs 30 are established via links 50 utilizing Signaling System No. 7 (SS7) Transaction Capabilities Application Part (TCAP), or other Signaling Control Connection Part (SCCP) based application layer protocols. More specifically, Intelligent Network Application Protocols (INAPs) sit on top of the TCAP protocols to establish a control dialogue between the SSPs 20 and the SCP 30. Furthermore, in order to multiplex a plurality of SCPs 30 with a plurality of SSPs 20, a signal transfer point (STP) 60 is interfaced therebetween to properly route and to deliver data and signals.

Utilizing the above architecture, an incoming or outgoing call connection is initially received by a serving SSP 20 associated with a particular subscriber terminal 40. Since the SSP 20 has no "intelligence" to determine what kind of call treatment should be applied toward the received call connection, the SSP 20 performs a query requesting call treatment instructions to the associated SCP 30 over the connected TCAP link 50.

In order to enable a serving SSP 20 to identify and to perform a query with an associated SCP 30, the directory number assigned to a particular IN subscriber uniquely identifies a particular SCP 30 as the serving SCP for that subscriber. Each SCP 30 is pre-allocated with a series of directory numbers, such as a block of a thousand numbers from the NPA-NXX-XXXX number series. Each time a new IN subscriber subscribes to a particular SCP 30 or associated IN service, one of the pre-allocated numbers is assigned to the new subscription representing the new IN subscriber. Thereafter, by maintaining such an one-to-one relationship between a particular IN subscriber and an SCP via the assigned directory number, the serving SSP 20 is able to identify and to query the correct SCP 30 for IN service. As an illustration, a first SCP 30A stores subscription data representing subscribers one through fifteen (1–15). A second SCP 30B similarly stores subscription data and provides IN services towards subscribers sixteen through thirty (16–30). A third SCP 30C similarly serves IN subscribers thirty-one through forty-five (31–45).

In response to an incoming call connection towards a particular subscriber, the serving SSP determines which SCP is associated with the indicated directory number representing the called party subscriber. The serving SSP 20 then transmits a query signal towards the identified SCP 30. The SCP 30, in turn, retrieves the relevant subscriber data, ascertains the appropriate subscriber service to be provided, and instructs the serving SSP 20 to effectuate the desired call treatment.

Figure 2:
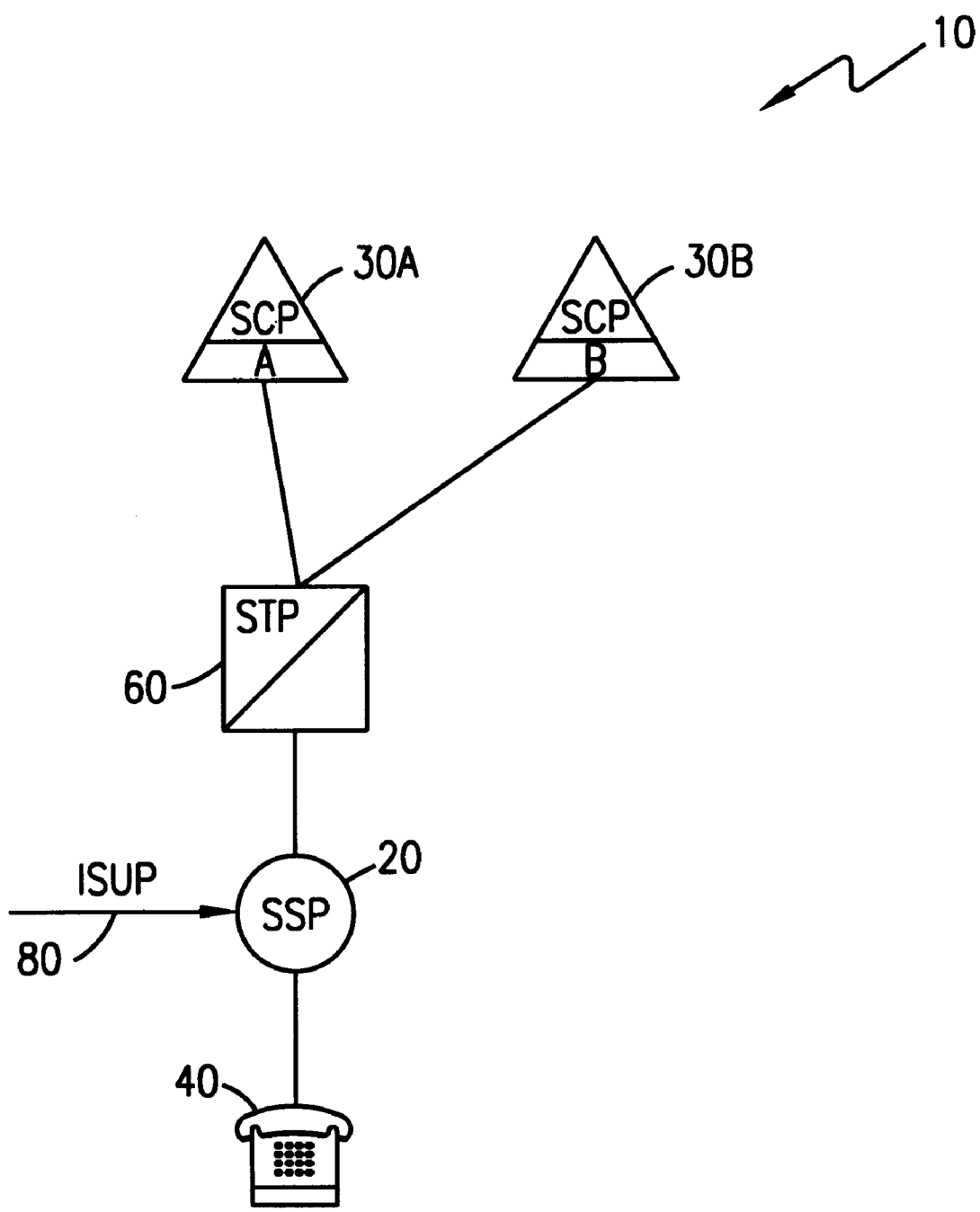
FIG. 2 is a block diagram of an IN illustrating the introduction of a new SCP to an IN subscriber.

FIG. 2 is a block diagram of an IN 10 illustrating the introduction of a new SCP to an IN subscriber. A first SCP 30A provides IN service A to an IN subscriber 40 via a serving SSP 20. Accordingly, the IN subscriber is assigned with a directory number uniquely identifying the first SCP 30A. As a result, all incoming call connections received by the serving SSP 20 towards the IN subscriber terminal 40 are queried toward the first SCP 30A. Using its Service Script Logics (SSLs) and subscription data representing the IN subscriber, the first SCP 30A determines which IN service needs to be effectuated for each service request.

When a second SCP 30B introduces new IN service B, and the IN subscriber 40 wishes to be provided with such a service, the existing subscription data are removed from the first SCP 30A and a new subscription agreement is established with the second SCP 30B. Furthermore, in order to enable the serving SSP 20 to perform a query thereafter with the second SCP 30B, a directory number uniquely identifying the second SCP 30B is re-assigned to the IN subscriber 40. Because of the one-to-one restriction imposed on the IN based telecommunications network, unless the IN subscriber is willing to forego IN service A, the new SCP 30B also needs to provide IN service A previously supported by the first SCP 30A. Without the new SCP 30B supporting both services, the IN subscriber is conventionally not able to access both features via two different SCPs 30A and 30B using the same directory number.

Figure 3:
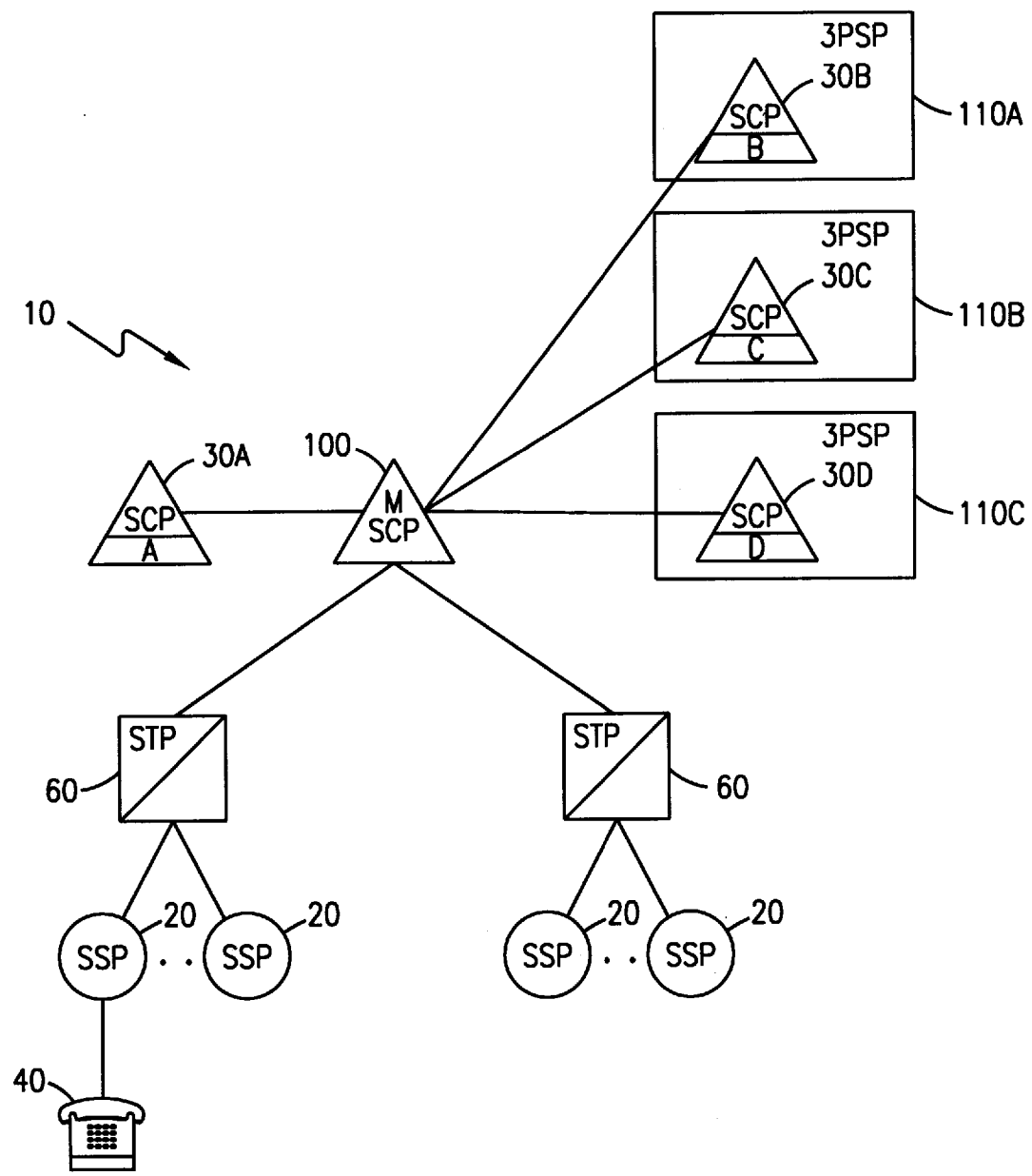
FIG. 3 is a block diagram of an IN illustrating the introduction of a mediation SCP in accordance with the teachings of the present invention.

FIG. 3 is a block diagram of an IN 10 illustrating the introduction of a mediation SCP 100 in accordance with the teachings of the present invention. In order to eliminate the one-to-one relationship restriction imposed on the existing IN based telecommunications network 10, a mediation SCP 100 is introduced.

A single telecommunications provider or supplier typically controls and operates all associated SSPs and SCPs within a particular geographic area. Accordingly, introduction of new IN services and/or nodes can be conventionally effectuated by placing or "loading" the new software/hardware modules within each of its associated SSP and/or SCP platforms. However, with de-monopolization and low barrier to entry into the telecommunications industry, a third party vendor or privately operated vendor is able to develop and introduce a new SCP with new IN services into an existing IN based telecommunications network. For example, an UNIX or even PC based platform can be introduced to provide a new IN service to existing telecommunications subscribers. The new platform merely needs an interface module for communicating Signaling Control Connection Part (SCCP) based signals with the existing IN based telecommunications network 10.

As an illustration, a primary service provider or network provides IN service A via a first SCP 30A. A first third party service provider (3PSP) 110A then provides IN service B via an independently operated and maintained SCP 30B. Likewise, a second and third party service providers 110B and 110C provide IN services C and D via a third SCP 30C and fourth SCP 30D, respectively.

In order to avoid the one-to-one relationship imposed on the existing IN based telecommunications network, a medication SCP 100 is then interfaced between a serving SSP 20 and each of the available SCPs 30A–30D. When an incoming call connection, for example, is received by the serving SSP 20, regardless of with which SCP the IN subscriber is associated through its directory number, the serving SSP 20 transmits a query signal to the mediation SCP 100. Accordingly, as far as each serving SSP 20 is concerned, the mediation SCP 100 functions as its associated SCP, and the rest of the SCPs 30A–30D become transparent to the serving SSPs 20. The mediation SCP 100 then determines which SCP or SCPs need to be invoked for this particular service request.

With the introduction of the mediation SCP 100, the IN subscriber 40 is no longer limited to services being provided by a single SCP. The IN subscriber 40 may subscribe to IN service A associated with the first SCP 30A and to IN service B associated with the second SCP 30B. By analyzing the data received within the query signal from the serving SSP 20, the mediation SCP 100 determines which SCP needs to be invoked for this particular service request. Furthermore, in case the mediation SCP 100 needs to execute more than one SCP, the order of such execution is further determined by the mediation SCP 100. The control from a first SCP to a second associated SCP is then effectuated by the mediation SCP 100 as well. Furthermore, data determined by the first SCP are communicated to the second SCP for further effectuation of appropriate IN services. This is all effectuated while maintaining one directory number for the subscriber. As a result, each time a new IN service is being provided by a new SCP, the subscriber can gain access to the new service without changing his or her existing directory number. Subscription data representing the subscriber merely need to be updated to instruct the mediation SCP to invoke the new SCP.

After the execution of each SCP, the executed SCP can only communicate with the mediation SCP 100. This is to ensure the network integrity and to follow the Open System Interface (OSI) standard by forcing the serving SSP 20 to receive a return signal from a telecommunications node (mediation SCP 100) with which the serving SSP 20 has originally transmitted a signal.

Figure 4:
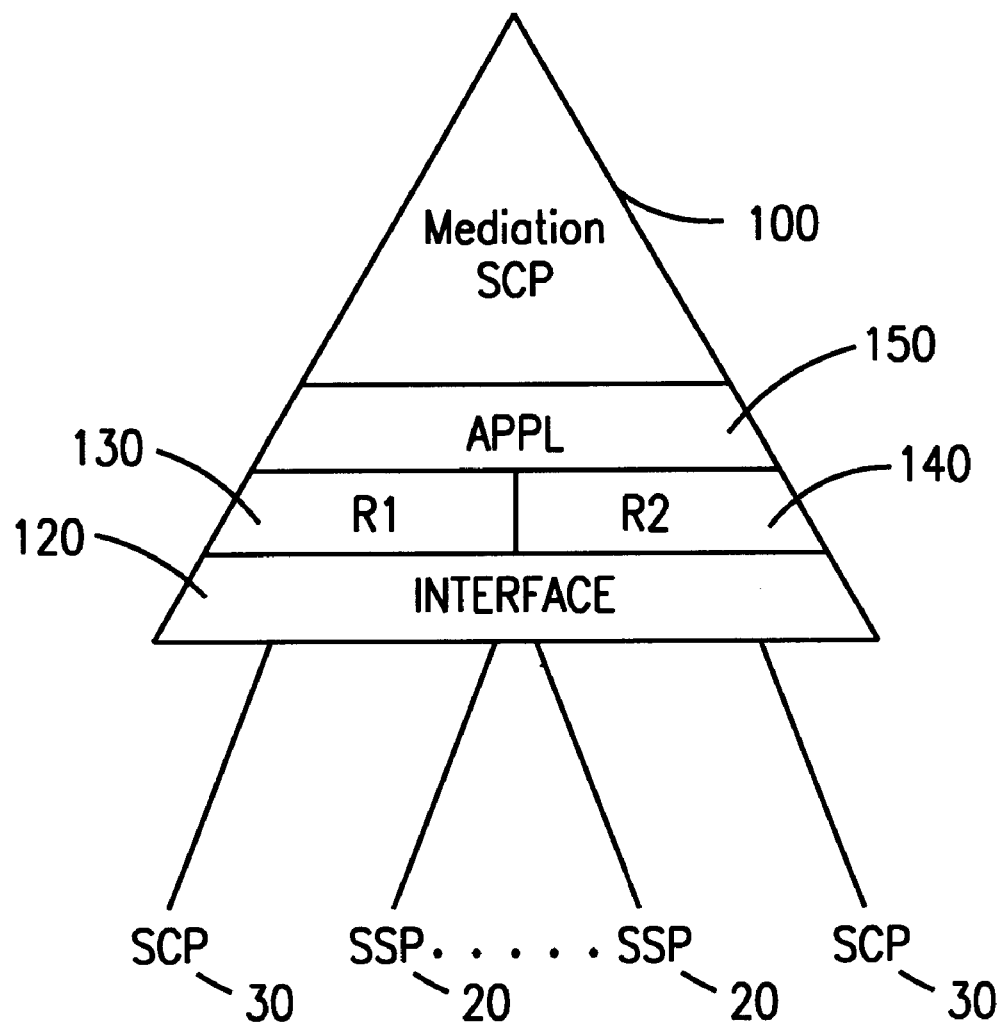
FIG. 4 is a block diagram of a mediation SCP illustrating the architecture associated therewith.

FIG. 4 is a block diagram of the mediation SCP 100 illustrating the architecture associated therewith. The mediation SCP 100 includes an interface module 120 for communicating SCCP based signals with associated SSPs 20 and SCPs 30. Since the mediation SCP 100 functions similar to a normal IN SCP, there is no need for an interface to communicate Integrated Service User Part (ISUP) based or other circuit oriented call connection signals. Further included within the mediation SCP 100 is a first register (R1) for storing data correlating each associated IN subscriber directory number with one or more SCPs. As an illustration, data representing a first IN subscriber reflect that IN service A within a first SCP and IN service B within a second SCP are associated thereto. Further stored within the first register (R1) 130 are data specifying the order of execution within the associated IN services or SCPs for that IN subscriber. Accordingly, the data stored within the R1 130 dictates which SCP or IN service needs to be invoked or executed before other associated SCP or IN service can be invoked. Furthermore, in case two or more IN services or SCPs need to be invoked simultaneously or concurrently, such data are further stored within the first register (R1) 130.

Included within the mediation SCP 100 is a second register (R2) 140 for storing data utilized for authenticating and error-checking data and parameters received from the third party service operators. Since the main or primary service provider no longer has strict control over all of the associated SCPs providing IN services, data and their characteristics, such as formats, syntax, standards and protocols, need to be evaluated by the mediation SCP 100. This is ensure that the data transmitted by a first SCP, for example, will not corrupt or interrupt existing IN services being provided by other SCPs. Accordingly, the second register (R2) 140 stores data enabling the mediation SCP 100 to authenticate and to error-check data and associated parameters communicated between each SCPs.

Utilizing the first register (R1) 130, the second register (R2) 140, and the interface module 120 is a user definable and controllable application module 150. The application module 150 accesses the stored data to identify one or more SCPs and associated IN services that need to be invoked for each service request. The application module further provides the determined IN service by sequentially or concurrently invoking or executing the determined SCPs. As described above, a plurality of SCPs may need to be executed in order to provide a desired IN service towards a particular IN subscriber. For example, IN service A being provided by a first SCP screens incoming calls depending on the time of the day. If a call is received during working-hours, for example, the incoming call is directed or forwarded to a first directory number. For other cases, the call is forwarded to a second directory number instead. Additionally, the same IN subscriber also has subscription with IN service B which is being provided by a second SCP. IN service B forwards incoming call depending on the calling party directory. If a call is originated from a first calling party subscriber, it is forwarded to a third directory number. Similarly, if a call is originated from a second calling party subscriber, it is instead forwarded to a fourth directory number. If there is no match with the calling party directory number, a normal incoming call setup is established.

If the IN subscriber wishes to first screen his or her incoming calls using IN service A and then further reroute the received incoming calls using IN service B, the first SCP needs to be executed by the mediation SCP. The determined directory number from IN service A along with the original calling party directory number then need to be provided to IN service B. The IN service B evaluates the associated calling party directory number and further determines with which forward-to-number this particular incoming call needs to be established.

Figure 5:
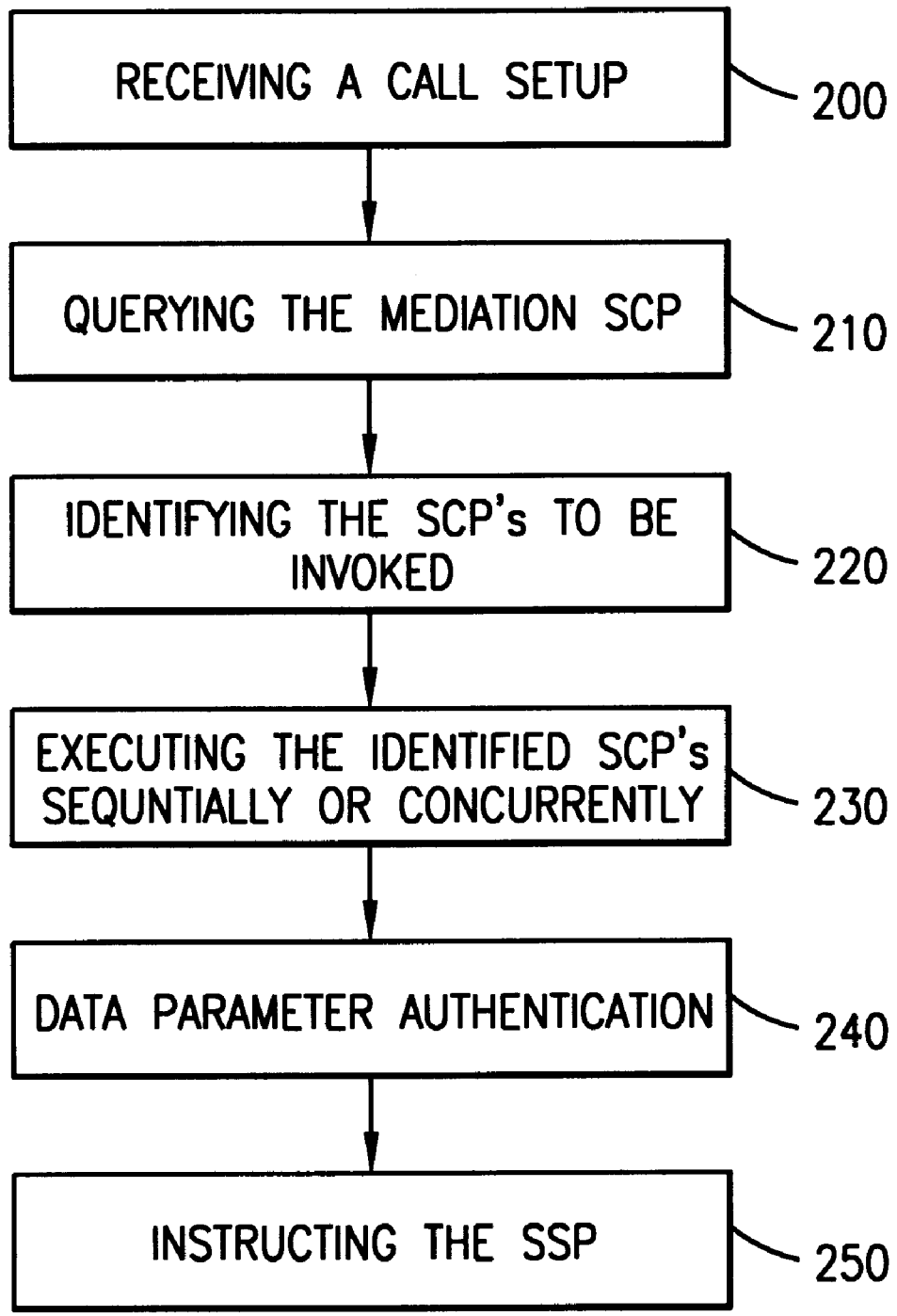
FIG. 5 is a flowchart diagram illustrating the steps performed by an IN to effectuate an IN service in accordance with the teachings of the present invention.

FIG. 5 is a flowchart diagram illustrating the steps performed by a serving IN based telecommunications network to effectuate an IN service in accordance with the teachings of the present invention. A service request signal, such as an Initial Address Message, towards a particular IN subscriber is received by a particular SSP at step 200. Regardless of which SCP is associated with the indicated IN subscriber, the serving SSP sends a SCCP based query signal to the mediation SCP at step 210. Using data stored at the associated registers, an application module associated with the mediation SCP then determines which IN service and SCP needs to be executed for this particular service request. If more than one SCP or IN service is associated with the IN subscriber, a further determination is made as to the order of execution of the identified SCPs at step 220. The application module then either sequentially or concurrently executes the identified SCPs in a determined manner at step 230. If the identified SCPs are executed sequentially, relevant data are appropriately communicated from a first SCP to a second SCP by the mediation SCP. The application module further authenticates and error-checks data and parameters received from each of the SCPs before they are communicated with another SCP or SSP at step 240. Such error checking includes evaluating data values, parameters, formats, syntaxes, signal names, protocols, and etc. After making a determination that all of the associated SCPs for the IN subscriber have been executed, the mediation SCP transmits a SCCP based signal back to the serving SSP with instructions to provide a determined call treatment towards the received incoming call connection at step 250.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for providing multiple IN services via multiple service control points (SCPS) within a telecommunications network, said method comprising the steps of:

receiving a signal at a mediation service control point (SCP) associated with said telecommunications network, said signal requesting an IN service toward a particular subscriber;

identifying a plurality of service control points (SCPs) associated with said particular subscriber which need to be accessed in order to provide the requested IN service;

determining an order of execution with respect to said identified plurality of SCPs; and communicating with said identified plurality of SCPs in the determined order of execution to provide said requested IN service toward said particular subscriber.

2. The method of claim 1 wherein said step of communicating with said identified plurality of SCPs further includes the steps of:

receiving a signal from each of said plurality of SCPs, said signal including data parameters; and authenticating and error-checking said received data parameters within the signal by said mediation SCP.

3. The method of claim 2 further comprising the step of communicating said authenticated signal to a service switching point (SSP) serving said subscriber.

4. The method of claim 1 wherein said step of communicating further comprises the steps of:

executing a first SCP in the determined order of execution;

receiving a signal at said mediation SCP from said first SCP, said signal including data representing routing instructions associated with said subscriber; and executing a next SCP in the determined order of execution by communicating said received first SCP data from said mediation SCP to said next SCP.

5. The method of claim 1 wherein the determined order of execution comprises concurrently executing said identified plurality of SCPs.

6. The method of claim 1 wherein the determined order of execution comprises sequentially executing said identified plurality of SCPS.

7. A telecommunications node for associating a plurality of service control point (SCP) with a particular subscriber within a telecommunications network, said subscriber further associated with a particular service switching point (SSP), comprising:

an interface module for interfacing with said plurality of service control points (SCPs) and with said SSP;

a first register for storing data correlating said plurality of SCPs with said subscriber and for identifying an order with which the plurality of SCPs need to be executed in order to provide a requested IN service toward said particular subscriber; and an application module for accessing said first register to identify the plurality of applicable SCPs and the order for execution in order to provide the requested IN service to said subscriber.

8. The telecommunications node of claim 7 wherein said interface module is capable of communicating Signaling Connection Control Part (SCCP) based signals.

9. The telecommunications node of claim 7 further comprises a second register for storing data to authenticate and to error-check data received from said plurality of SCPs.

10. The telecommunications node of claim 7 wherein the order of execution specifies an order that the plurality of SCPs need to be sequentially executed in order to provide the requested IN service toward said particular subscriber.

11. The telecommunications node of claim 7 wherein the order of execution specifies an order that the plurality of SCPs need to be concurrently executed in order to provide the requested IN service toward said subscriber.

12. A system for providing a telecommunications service toward a particular subscriber within a telecommunications network, comprising:

a plurality of service control points (SCPs) each providing a particular subscriber service;

a local end office for serving a particular subscriber; and a mediation service control point for interfacing said plurality of SCPs with said local end office for providing said telecommunications service toward said particular subscriber, wherein said mediation service control point includes a register for storing data correlating a plurality of SCPs with said subscriber and an application module for accessing said register to identifying the plurality of SCPs that need to be executed in order to provide a requested IN service to said subscriber as well as an order with which the identified plurality of SCPs must be executed in providing the requested IN service to said subscriber.

13. The system of claim 12 wherein said local end office comprises a Service Switching Point (SSP) serving said subscriber.

14. The system of claim 12 wherein said mediation SCP further comprises a register for storing authentication data utilized for error-checking data received from one or more of said plurality of SCPs associated with said subscriber.

15. The system of claim 12 wherein the order with which the SCPs must be executed specifies an order that the plurality of SCPs need to be sequentially executed in order to provide the requested IN service toward said subscriber.

16. The system of claim 12 wherein the order with which the SCPs must be executed specifies an order that the plurality of SCPs need to be concurrently executed in order to provide the requested IN service toward said subscriber.

* * * * *